(Model.) 3 Sheets—Sheet 1.
H. FLAD.
APPARATUS FOR SPRINKLING STREETS.
No. 288,222. Patented Nov. 13, 1883.
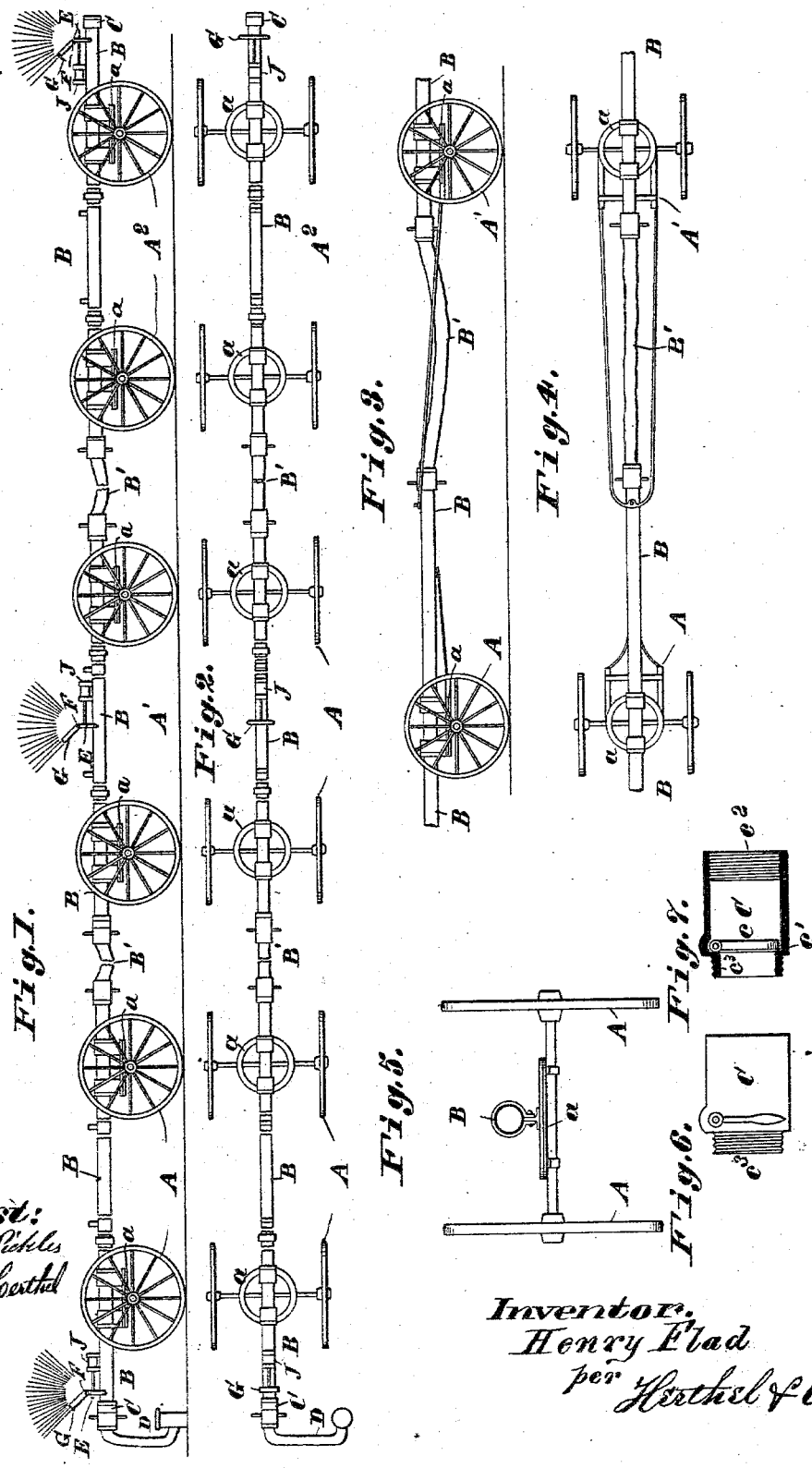

(Model.)
H. FLAD.
APPARATUS FOR SPRINKLING STREETS.
No. 288,222. Patented Nov. 13, 1883.
3 Sheets—Sheet 2.
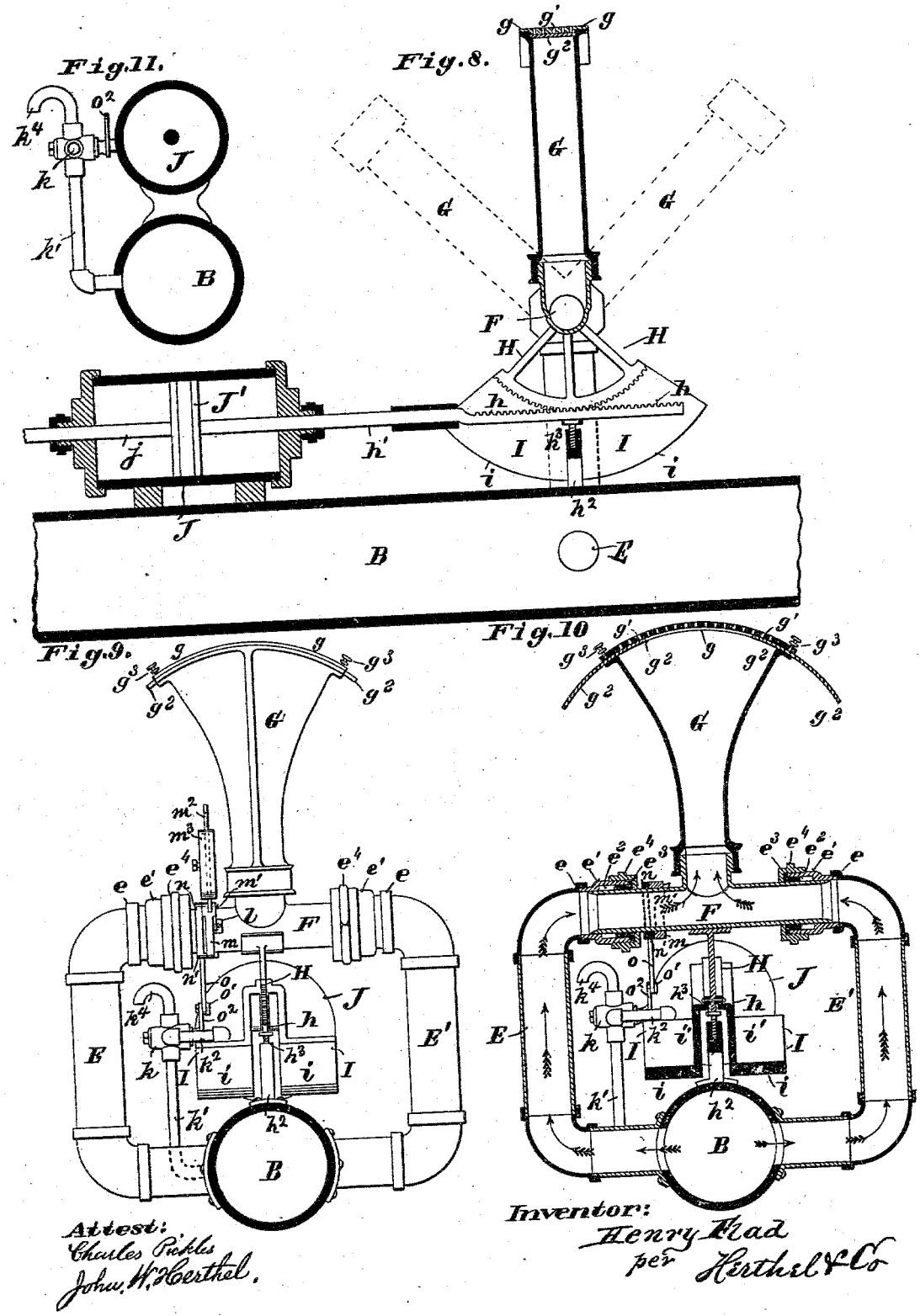
Attest:
Charles Pickles
John W. Herthel
Inventor:
Henry Flad
per Herthel & Co (Model.)
3 Sheets—Sheet 3.
H. FLAD.
APPARATUS FOR SPRINKLING STREETS.
No. 288,222. Patented Nov. 13, 1883.
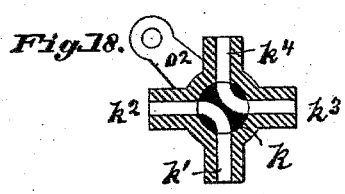
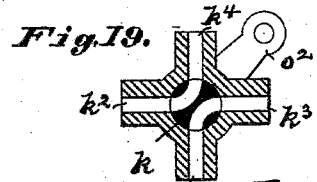
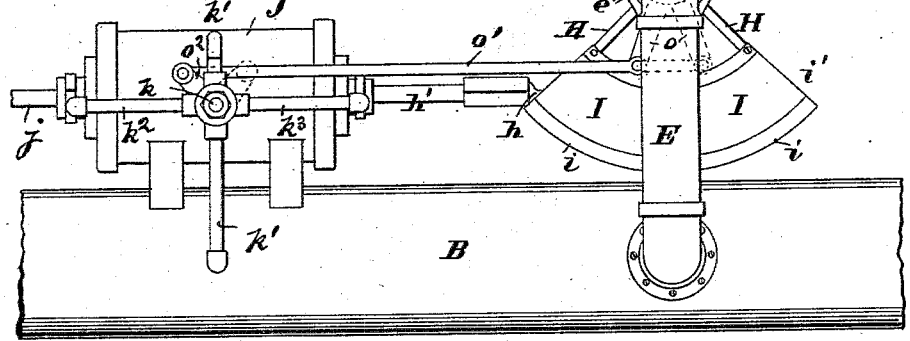
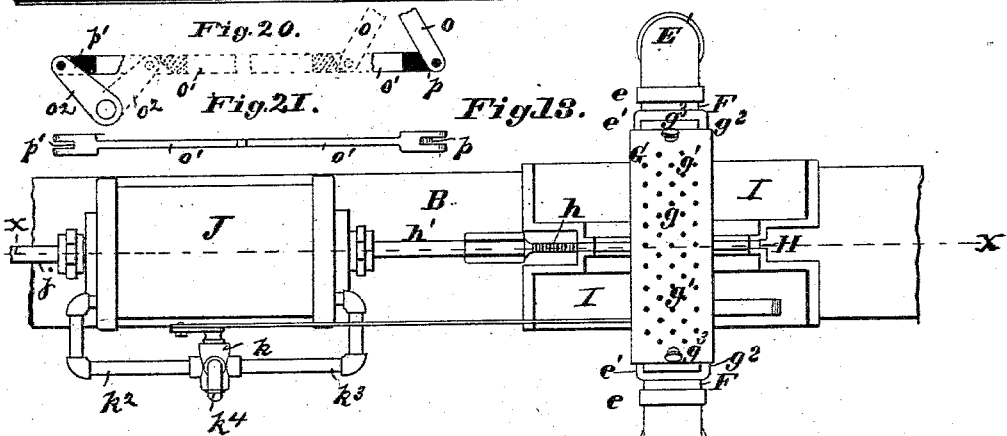
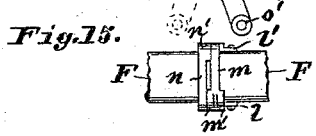
Attest:
Charles Pickles
John W. Herthel
Inventor:
Henry Flad
per Herthel & Co

UNITED STATES PATENT OFFICE.

HENRY FLAD, OF ST. LOUIS, MISSOURI.

APPARATUS FOR SPRINKLING STREETS.

SPECIFICATION forming part of Letters Patent No. 288,222, dated November 13, 1883.

Application filed August 1, 1881. (Model.)

*To all whom it may concern:*

Be it known that I, HENRY FLAD, a citizen of the United States, residing at St. Louis and State of Missouri, have invented a new and useful Method of and Apparatus for Sprinkling Streets, of which the following is a specification.

This invention relates to improvements for watering or sprinkling the roads, streets, avenues, or other area of ground.

It is chiefly the aim and design of my invention to sprinkle large areas of surfaces or distances—say the entire length and width of a roadway extending the distance of half a block, or half the distance generally existing from one water or fire plug to the next—and to accomplish said sprinkling action at one and the same time and operation. This done, to sprinkle the next similar distance or area, and so on. Hence my improvements are specially serviceable for the use of towns, cities, &c.

The objects of the invention are to lay the dust and prevent the many inconveniences and disadvantages arising from said cause; also, to provide a more systematic and thorough method in place of the slow and ineffectual manner which characterizes the present mode of watering and sprinkling roadways. I attain these objects by the mechanism illustrated in the accompanying drawings, in which—

Sheet I, Figure 1 is a side elevation of the complete apparatus as it appears when in operation. The main pipe is only here indicated in broken sections, in order more fully to show at a glance in said figure the entire apparatus or mechanism mounted upon its system of trucks. Fig. 2 is a plan view of the entire parts shown in Fig. 1. Fig. 3 is a side elevation chiefly to show how the trucks are united together by the flexible (hose) as well as rod connections. Fig. 4 is a plan view of Fig. 3. Fig. 5 is an end or front elevation of a truck, showing its fifth-wheel, and the main pipe centrally attached to the truck. Figs. 6 and 7 are enlarged detail views of the check-valve employed, the former figure being a side elevation and the latter a sectional elevation. Sheet II, Fig. 8 is an enlarged longitudinal sectional elevation taken on line $x\,x$ of Fig. 13, Sheet III, showing part of main pipe in section, also its cylinder, the connection between the piston and the sector-gear of nozzle, the latter being shown in section, while the dotted lines represent the different portions of the nozzle when oscillating. Fig. 9 is a transverse view, representing the main pipe in section, with front view of the pipes that branch from each side, and their rock-shaft carrying the nozzle, with its sector-gear and counter-balance; also showing the drop-weight and its connection to four-way cock fitted in the induction and exhaust pipes that connect with the cylinder. Fig. 10 is a sectional elevation chiefly of the parts shown in Fig. 9. Fig. 11 is a detail view to show connection of main pipe to cylinder by means of the vertical feed-pipe and its four-way cock. Sheet III, Fig. 12 is an enlarged side elevation of one of the cylinders and its pipe-connections to the main pipe of the apparatus; also said figure is a side elevation of the counter-balanced nozzle and its pipe-connections to main pipe; also said view shows the four-way cock and its connections to the drop-weight, and its collar on the axle of the nozzle; also is seen the piston-rod connection to sector-wheel of nozzle. Fig. 13 is simply a plan view of Fig. 12. Fig. 14 is a detail view, showing the two lugs on the axle of the nozzle, also the loose collar that carries the drop-weight and the positions assumed by the latter. The crank shown in said figure forms part of another collar on the axle, which is shown separate in Fig. 17. Fig. 15 is a plan view of the axle portion and its two collars, the one alongside of the other. Fig. 16 is a side view of the collar that carries the drop-weight. In each of said figures (14 16 17) the cross-lines represent the face part of the collar, while the unshaded part represents the lug portion of collar. Figs. 18 and 19 are respective sectional views enlarged to show the four-way cock in its two different positions with relation to the four pipes. Figs. 20 and 21 are views of the connecting-rod to show the inclined shoulders in its slotted terminations or ends that estop the movements of its pivoted cranks.

A suitable truck or carriage is employed to render the apparatus portable. In practice I employ three trucks, A A' A², each one succeeding the other in a straight row, and being properly connected some distance apart, each having fifth-wheel $a$, while the shaft for draft purposes can be connected to either end of the system of trucks.

B represents the main pipe, which is mounted (in sections) upon the system of trucks, being arranged to extend centrally the entire length of same. (See Figs. 1, 2, 3, 4, 5.)

B' represents sections of hose which are employed between the distances that separate the trucks. The center truck has its main pipe B coupled to both the flexible or hose sections B', and the latter have their remaining ends simply coupled to the main pipe of the remaining trucks, thus establishing continuity of the entire main pipes B B' from one end of the apparatus to the other. (See Figs. 1, 2, 3, and 4.) At each end of the apparatus the main pipe B is provided with a check-valve, C. (See Figs. 1, 2, 6, and 7.) These check-valves automatically open the water-communication between the "head" or "water-supply"—such as a fire-plug—and the apparatus proper, (see illustrations 1 and 2;) also, when the fire-plug is "shut off," the said valves automatically close the apparatus—viz., close the ends of its main pipe. Each check-valve C consists of a housing containing a hinged or flap valve, $c$, which opens away from or closes against a seat, $c'$. (See Figs. 6 and 7.) The check-valve C at $c^2$ has internal threads to make connection to the end of the main pipe B, and at $c^3$ said check-valve has external threads, to which the hose can be coupled, and which connects to the fire-plug. The water-pressure from the fire-plug opens the valve $c$ and keeps same open during the time said pressure enters the apparatus, and renders same operative. As soon as the water-supply from the plug is shut off the reflex action or back-pressure in the main pipe B instantly closes the valve $c$ against its seat. The apparatus can thus retain its water, and only the opening or closing of the fire-plug is required to estop the operation of the entire sprinkling apparatus, and render same quickly serviceable for another change of locality.

D is the hose employed to establish water-communication with either end of the main pipe and the power source or fire-plug. The hose D has one end properly coupled to one of the check-valves C, the other end of said hose being coupled to the fire-plug. (See Figs. 1 and 2.) When so connected and the plug is opened, the water-pressure opens the one check-valve, enters and fills the entire main pipe B B', escape of water being prevented at the opposite end of the apparatus by the water-pressure closing the check-valve at said end. From the main pipe B of each truck the water can pass through vertically-arranged branch pipes into a hollow rocking shaft, and from this into the oscillating nozzle, to be discharged.

E E' represent the side or branch pipes. F represents the axle of oscillation, being a hollow rocking shaft. G represents the oscillating nozzle proper, all shown in Figs. 1, 2, 9, 10, and 13. The nozzle for sprinkling purposes oscillates during the act of jetting forth the water; hence the nozzle G by its rocking-shaft F is journaled in the top elbows of the side pipes, E E', in the following manner: The ends of the hollow shaft F extend to each of the top elbows, and to the screw-flange $e$ (of the elbows) is united a gland or sleeve, $e'$. The packing $e^2$ is interposed between the shoulder of the gland and a collar, $e^3$, which by its shoulder abuts against the gland. Finally, the coupling or cap $e^4$ is screwed to the gland, completing the joint, all of which is more clearly shown in Figs. 9 and 10. Both ends of the hollow shaft are thus similarly journaled to the elbows of the side or branch pipes, E E', the fitting internally of the said connecting parts being made as flush as possible to permit easy flow of the water.

G, the nozzle proper, is sector-shaped, its nozzle-mouth being covered by a curved plate, $g$, which has the series of perforations or discharge-openings $g'$, from which the water jets, all as shown in Figs. 1, 8, 9, 10, 12, 13.

$g^2$ are two similar curved plates or slides for the purpose of partly or entirely covering the under side of the perforated mouth-plate $g$, in order to leave open or close the discharge-openings $g'$ of the nozzle. Each of the slides passes through respective slots made in the ends of the nozzle, resting and capable of sliding upon the inner shoulders of the nozzle, as indicated in Figs. 8, 9, 10, 12, 13. The slides partly extend outside of the nozzle, so that the operator can slide or change their positions, the set-screws $g^3$ being provided to secure in adjusted position the said slides. (See Figs. 9, 10, 12, 13.) The water passing through the nozzle by its perforated mouth-plate is divided into fine streams or jets suitable for sprinkling, and by means of the slides the operator can control the discharge of water through the nozzle, also regulate the distribution of the jets, so as to water or sprinkle the street or area to suit requirements. The nozzle by its lower tubular end is screwed to the central branch of the hollow shaft F. (See Figs. 9, 10.) The shaft therefore serves as the axle of oscillation for the nozzle, also, as tubing, freely permits the flow of water to reach and enter the nozzle.

H is a tooth-sector secured to the hollow shaft F, and extends centrally below same to gear with the straight rack $h$, that is coupled to the piston-rod $h'$. (See Figs. 8, 12, and 13.)

I I together represent the counter-balance for the nozzle. This counter-balance consists of two similar parts—viz., a bottom curved plate, $i$, forming part at a right angle to a vertical plate, $i'$. (See Figs. 8, 9, 10, 12, 13.) Both the parts I I (constituting the counter-balance) are bolted to the lower part of the sector-wheel, being further so arranged that an open space exists between the counter-balance for the passage and operation of the rack $h$. (See Figs. 8, 9, 10, 13.)

$h^2$ is a proper standard to support and keep the straight rack in gear with the sector-wheel. This standard or rest has its lower end bolted on the top of the main pipe, and the top of said standard is provided with an adjustable screw, $h^3$, upon which the straight rack rests and is guided. (See Figs. 8, 9, 10.)

The further mechanism that imparts oscillation to the nozzle and its parts is as follows: A small cylinder, J, is provided with piston J', to which the piston-rod $h'$ is connected, also the guide-rod $j$, both said rods extending through proper stuffing-boxes in the heads of the cylinder. (See Figs. 8, 12, 13.) The cylinder and its parts are properly mounted on top of the main pipe, and the piston-rod $h'$ is properly joined to the straight rack $h$, so that the reciprocation of the piston shall impart oscillation to the nozzle and its parts.

As stated to be in the nature of my invention, the water-pressure is utilized to automatically oscillate the nozzle—that is, the water from the main pipe communicates in alternate manner to the respective ends of the cylinder to produce the reciprocation of its piston and the parts connected therewith. These results are achieved by the employment of the four-way cock $k$, which controls the passage of water through the four pipes $k'$ $k^2$ $k^3$ $k^4$, the arrangement of all of which is shown in the several Figs. 9, 10, 11, 12, 13, 18, 19. Of the four just-named pipes, $k'$ is the vertical or feed pipe that establishes water-communication between the main pipe of the apparatus and the ports in the cock. $k^2$ $k^3$ are the pipes that become alternately the induction and eduction pipes. Lastly, $k^4$ is the discharge or exhaust water-pipe, permitting the water to be discharged from cylinder into the atmosphere. (See Figs. 9, 10, 11, 12, 13, 18, 19.) In Figs. 18, 19 the quarter-turn of the cock is shown to establish communication alternately with the pipes $k^2$ $k^3$, (more specifically stated in Fig. 18.) The pipe $k^2$ is shown as the induction-pipe, being in communication with the main pipe, (through the vertical feed-pipe $k'$,) admitting through same the water to one end of the cylinder. At the same time the discharge of water from the opposite end of the cylinder takes place through the pipe $k^3$, (as eduction,) out of exhaust or final discharge pipe $k^4$. In Fig. 19 the position of said parts is reversed. The pipe $k^3$ becomes the induction-pipe, the pipe $k^2$ serving as eduction, being in communication with the discharge-pipe $k^4$. The operation of the piston in the cylinder is therefore analogous to that in a steam-cylinder engine. The water-pressure admitted to one side of the piston drives the same forward, expelling the water before it out of the final discharge, and vice versa when the position of the cock is reversed.

The following mechanism automatically at proper periods reverses the position of the cock to establish in an alternate manner water-communication with either end of the cylinder. To the axle of oscillation are secured two lugs, $l$ $l'$, (see Figs. 9, 14, 15;) also on said axle are fitted loosely two collars, $m$ $n$. (See Figs. 9, 10, 12, 14, 15, 16, 17.) The collar $m$ has at $m'$ opposite projections or lugs; also, said collar carries a stem, $m^2$, and on this can be adjustably secured the drop-weight $m^3$. (See Figs. 9, 10, 12, 14, 15, 16. The collar $n$ has only one lug, at $n'$, which is in line of travel with the lug $m'$ of its contiguous collar $m$. (See Figs. 9, 10, 15, 17. Further, the collar $n$, by crank $o$, connecting-rod $o'$, and the opposite crank, $o^2$, connects to the four-way cock, as shown. As apparent, the collar $m$ (carrying the weight) is actuated by the lugs on the axle in accordance with the direction said axle oscillates. When one of the lugs on the oscillating axle comes in contact with the lug on the collar $m$, the latter is carried with said axle, at the same time the weight is lifted. As soon as said weight passes the vertical center line, it, together with its collar, drops, and in falling strikes against the remaining collar, and the turn movement on the part of both of said collars and the weight is continued until the four-way cock has been sufficiently turned to reverse the position of its ports with relation to the pipe-communications to the cylinder. The reverse movement on the part of the just-described valve-gear is accomplished in a similar way by the opposite lug on the axle first actuating the collar carrying the weight, this in turn by gravity partially turning the collar that is connected to the cock until it is reversed, or all the parts are restored to their original position.

G is the oscillating nozzle or axle that performs the function of partially turning the collar $m$ until its weight assumes a position a little beyond the vertical center line. By the time said weight has been so lifted to the position just stated or is ready to fall by gravity, the nozzle proper has already assumed, say, either of the positions indicated by the dotted lines in Fig. 8, being nearly at the end of its stroke or the limit of its oscillation. The cock and its connections to the collar $n$ remain stationary until the gravity of the drop-weight has actuated both collars $m$ $n$ together to produce the reverse motion; hence be it noted the axle in motion at the proper time lifts the weight to a position to drop, and it is the gravity of both collars and weight turning on the axle that reverses the cock.

Figs. 20 and 21 show the respective inclined shoulders or faces $p$ $p'$, which exist in the slotted termination of the ends of the connecting-rod, and by means of which the respective cranks, and consequently their connected parts, are estopped from further motion.

As shown in Figs. 1 and 2, each truck is provided with the cylinder and its parts, the side or branch pipes, axle of oscillation, nozzle parts, together with the valve-gear to reverse the cocks.

In order to carry out the method or system constituting the nature of my invention, notwithstanding the duplication of the said parts on each truck is the same, yet there is a special arrangement to be observed in mounting the parts with relation to each other or to those of the adjoining truck, and which is as follows: By referring to Figs. 1 and 2 it is indicated or shown that the center truck, A', has the mounted parts on top of the main pipe, so as to locate the nozzle in the center of said truck, while the same (or duplicate parts) for the remaining trucks are mounted on the top of main pipe near its extreme ends, locating the nozzles near the extreme end of the apparatus. The several nozzles occupy by this arrangement equidistant positions. Each nozzle can sprinkle the like distance right or left; hence the complete sprinkling action of all the nozzles at one time is such as not only to extend or sprinkle the entire length of the apparatus, but at both ends thereof the further distances covered by the discharge from the end nozzles.

The complete operation of the entire apparatus is as follows: The apparatus is located in the center of the roadway or area to be sprinkled. The connection of the hose with the fire-plug is made and the latter opened, so that the water-pressure enters the main pipe, and from this operates the moving mechanism on each truck. Each of the nozzles oscillating (in right or left direction) can be made to discharge the water in like jets or streams, like quantity of water, also sprinkle the like distance or area; also, by this method of sprinkling the distribution or discharge of the streams from each nozzle can be controlled to suit the nature of requirement, and a most perfect or uniform distribution of the water (as well as abatement of the dust) over the area within reach of the water-pressure is obtained. This done, the fire-plug is shut off, the hose is uncoupled therefrom, mounted upon the truck, and the apparatus is hauled to occupy the next location to repeat the operation of sprinkling over another similar distance or area.

Different lengths of hose can be employed to suit unequal distances from one plug to another, and to establish, as far as practicable, continuity of sprinkling over great lengths or distances.

What I claim is—

1. An apparatus for sprinkling purposes, constructed with a connected system of wheel carriages or trucks carrying a main pipe having check-valve at each end, the section of hose to connect said pipe to water under pressure, such as a branch of water and power supply system, the said main pipe further having in communication therewith oscillating discharge nozzles and cylinders containing a reciprocating piston, the said nozzles being positioned equidistant, and each related nozzle and piston having connected valve-gear to establish communication from main pipe alternately to the ends of the cylinders, by means whereof the water-pressure automatically reciprocates the several pistons, and the latter oscillates the nozzles to at same time discharge the water in the form of jets or streams over similar areas, substantially as described.

2. In combination with water and power supply system, the hose D, main pipe B, having check-valves C, consisting of a housing having a seat at $c'$, flap-valve $c$, and external and internal threads, $c^2 c^3$, said main pipe and its parts mounted on one or more trucks or carriages, whereby the said main pipe can be filled and kept charged with water, as and for the purposes set forth.

3. In an apparatus for sprinkling purposes, the combination, with water and power supply system, of a truck or carriage upon which is mounted a main pipe, B, having check-valves C at each end, the side or branch pipes, E E', and the hollow axle F, carrying the nozzle G, having discharge-openings $g'$, by means whereof the water-pressure communicates through said main pipe and its nozzle, in the manner and for the purposes set forth.

4. In combination with water and power supply system, the hose D, main pipe B, having check-valves C at each end thereof, the side or branch pipes, E E', their journaled hollow axle F, carrying the nozzle G, having perforations $g'$, controlled by slides $g^2$, the sector-wheel H, and counter-balance I I, all said parts being mounted on a truck or carriage, to operate substantially as and for the purposes described.

5. In combination with water and power supply system, the hose D, main pipe B, having valves C at each end, the branch pipes E E', the gland $e'$, packing $e^2$, collar $e^3$, coupling $e^4$, and hollow axle F, whereby the latter is journaled capable of oscillation at same time the water communicates through said parts, as and for the purposes set forth.

6. In combination with water and power supply system, the hose D, the main pipe B, with check-valves C at each end, the branch pipes E E', the journaled hollow axle F, having lugs $l l'$, and the two loose collars $m n$, the former having opposite lugs at $m'$, carrying a drop-weight, the latter collar having a single lug at $n'$, whereby the oscillating axle lifts the said drop-weight to a position to act by gravity upon the remaining collar, as and for the purposes described.

7. In combination with water and power supply system, the hose D, main pipe B, having check-valves C at each end, the feed-pipe $k'$, induction, eduction, and exhaust pipes $k^2 k^3 k^4$, four-way cock $k$, the cylinder J, its piston J', the branch pipes E E', the journaled hollow axle F, carrying the loose collar $n$, the crank $o$, the connecting-rod having the inclined shoulder-faces $p p'$, and the further crank-connection to four-way cock, by means whereof the latter can sufficiently turn at proper times to change the position of its ports with relation to the cylinder-pipes in communication therewith, as and for the purposes set forth.

8. In combination with water and power supply system, the hose D, main pipe B, having check-valves C, the feed-pipe $k'$, induction, eduction, and exhaust pipes $k^2 k^3 k^4$, four-way cock $k$, the cylinder with its piston, the branch pipes E E′, the journaled hollow axle F, having lugs $l l'$, and the two loose-fitting collars $m n$, the former having lugs at $m'$, carrying a drop-weight, the latter collar having lug only at $n'$, united by crank-rod connections to said four-way cock, by means whereof the said collars by gravity partially turn the said four-way cock to change its ports in the manner and for the purposes set forth.

9. In combination with water and power supply system, the hose D, main pipe B, having check-valve at each end, the feed, induction, eduction, and exhaust pipes $k' k^2 k^3 k^4$, four-way cock $k$, the cylinder, its piston and rod connections to discharge-nozzle G, the latter having perforations G′, the sector-wheel H, and counter-balance I I, said nozzle being in communication with a hollow axle, F, journaled to the branch pipes E E′, that communicate with the main pipe, by means whereof the water-pressure operates the said piston to impart oscillation to said nozzle, the latter at same time discharging the water in the manner and for the purposes set forth.

10. The improved sprinkling apparatus consisting of the system of trucks or carriages, upon each of which are mounted the following essential parts, viz: the main pipe B, continued by sections of pipe B′, and having check-valves at the extreme ends thereof, a cylinder, its piston and rods, its feed, induction, eduction, and exhaust pipes, its four-way cock, the branch pipes E E′, journaled hollow axle F, carrying discharge-nozzle G, having perforations $g'$, controlled by slides $g^2$, the sector-wheel H, counter-balance I, the standard $h^2$, its adjusting-screw $h^3$, the lugs $l l'$, loose collars $m n$, the former having the opposite lug, $m'$, with drop-weight, the latter collar having lug $n'$, and connected by crank $o$, rod $o'$, and crank $o^2$ to said four-way cock, and the hose D, all said parts combined with a water and power supply system, as shown and described, by means whereof the water can be discharged from each nozzle in like jets or streams, like quantity, and sprinkle the like distance or area.

HENRY FLAD. [L. S.]

Witnesses:
ALBERT B. METCALFE,
JOSEF SCHREIBER.